United States Patent
Iseki et al.

(10) Patent No.: US 8,778,072 B2
(45) Date of Patent: Jul. 15, 2014

(54) INK COMPOSITION, RECORDING METHOD, AND RECORDED ARTICLE

(75) Inventors: Hiromi Iseki, Shiojiri (JP); Kazuhiko Kitamura, Matsumoto (JP); Yasuhiro Oki, Matsumoto (JP); Ryosuke Teramoto, Matsumoto (JP); Shigemi Wakabayashi, Shiojiri (JP); Yasunari Ikeda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 178 days.

(21) Appl. No.: 13/480,601

(22) Filed: May 25, 2012

(65) Prior Publication Data
US 2012/0301685 A1 Nov. 29, 2012

(30) Foreign Application Priority Data
May 27, 2011 (JP) ................................. 2011-118784

(51) Int. Cl.
*C09D 11/02* (2014.01)

(52) U.S. Cl.
USPC ..................................... 106/31.48; 106/31.58

(58) Field of Classification Search
CPC .............................. C09D 11/328; C09D 11/38
USPC ........................................... 106/31.48, 31.58
See application file for complete search history.

(56) References Cited

U.S. PATENT DOCUMENTS

| | | | |
|---|---|---|---|
| 6,867,286 B1 * | 3/2005 | Holloway et al. | 106/31.48 |
| 7,163,576 B2 * | 1/2007 | Oshaughnessy et al. | 106/31.48 |
| 7,771,525 B2 * | 8/2010 | Morita et al. | 106/31.48 |
| 7,901,499 B2 * | 3/2011 | Kitamura et al. | 106/31.58 |
| 8,506,697 B2 * | 8/2013 | Morita et al. | 106/31.48 |
| 2008/0274285 A1 | 11/2008 | Okamura et al. | |
| 2009/0130399 A1 * | 5/2009 | Takahashi et al. | 106/31.48 |

FOREIGN PATENT DOCUMENTS

| | | |
|---|---|---|
| JP | 2004-091537 | 3/2004 |
| JP | 2004-099725 A | 4/2004 |
| JP | 2008-297541 A | 12/2008 |

\* cited by examiner

*Primary Examiner* — Helene Klemanski
(74) *Attorney, Agent, or Firm* — Nutter McClennen & Fish LLP; John J. Penny, V

(57) ABSTRACT

An ink composition contains a dye whose free acid is expressed by formula (1), lithium ions, and an aromatic compound having a carboxy group.

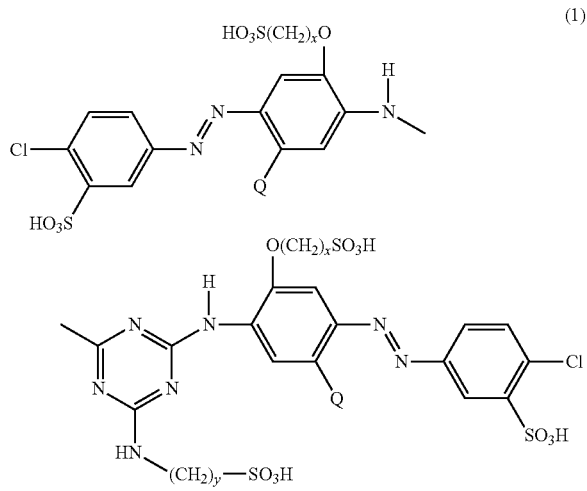

In formula (1), Q represents a halogen atom, x represents an integer of 2 to 4, and y represents an integer of 1 to 3.

15 Claims, No Drawings

INK COMPOSITION, RECORDING METHOD, AND RECORDED ARTICLE

The entire disclosure of Japanese Application No.: 2011-118784 filed on May 27, 2011 is expressly incorporated by reference herein.

BACKGROUND

1. Technical Field

The present invention relates to an ink composition, a recording method, and a recorded article.

2. Related Art

Inks containing a water-soluble dye are widely used for ink jet printers, fountain pens and the like. For such an ink, various capabilities are desired. For example, it is desirable that such an ink do not clog nozzles or pen tips, and that can dry rapidly, form sufficiently dense images and be stored stably. Also it is desirable that the color of the images formed by the ink do not change much.

It is considered that ink clogging is caused by solidification of a dye precipitated when water is evaporated from the ink. It is therefore believed that the use of a dye having a high saturation solubility in water, which does not easily precipitate even if its concentration is increased, makes clogging difficult. It is also believed that the degree of clogging can be reduced by increasing the color developability of the dye to relatively reduce the dye content in the ink.

In addition, it is incompatible to achieve an ink that does not easily cause clogging and to achieve an ink that can dry rapidly. In order to ensure a balance between these properties, it is studied that various compounds are mixed in the ink. Furthermore, dye molecules have been designed from the viewpoint of improving the color developability of the dye and the light fastness of the resulting images.

In particular, it is strongly desired to increase the light fastness of images formed using an ink containing a yellow dye. For example, JP-A-2008-297541 proposes an ink jet ink containing two yellow dyes, one of which has a pH-buffering ability. This patent document teaches that such an ink can form images superior in light fastness, color developability and hue, and can be stored stably.

JP-A-2004-099725 discloses an ink jet recording ink containing a water-miscible organic solvent and a dye. This patent document teaches that such an ink can be ejected stably without being dried, and can form images superior in hue, light fastness and water fastness. Furthermore, JP-A-2004-091537 discloses an ink jet ink set including a yellow ink containing a dye. This patent document teaches that the yellow ink has a high light fastness and can be ejected stably.

However, the above-mentioned known inks are not necessarily satisfactory in terms of, at least, the difficulty of clogging, the light fastness of the images formed with the inks, and the balance between these properties.

The present inventors found a dye that can impart extremely high light fastness to images, and found that the light fastness and moisture fastness of the resulting image and the difficulty of clogging can be increased by combining the dye and a specific compound.

SUMMARY

An advantage of some aspects of the invention is that it provides an ink composition that does not easily cause clogging and can form images having high light fastness. Another advantage of some aspect of the invention is that it provides an image exhibiting a high light fastness and a high moisture fastness and a recorded article including such an image.

The following embodiments of the invention solve at least part of the above-described issues.

Application 1

An ink composition according to an embodiment of the invention contains a dye whose free acid is expressed by formula (1), lithium ions, and an aromatic compound having a carboxy group.

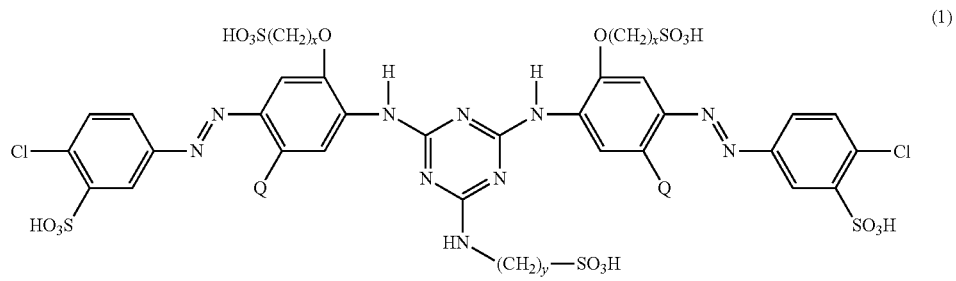

(In formula (1), Q represents a halogen atom, x represents an integer of 2 to 4, and y represents an integer of 1 to 3.)

The ink composition does not easily cause clogging because of the presence of the lithium ions, and can form an image having a high light fastness because of the presence of the dye. In addition, the recorded article produced using the ink composition exhibits a high moisture fastness because of the presence mainly of the aromatic compound.

The free acid mentioned herein refers to an acid in a form that is neither a salt nor ionized.

Application 2

The aromatic compound may have a naphthalene ring or a benzene ring.

Application 3

The aromatic compound may be at least one selected from the group consisting of 2-naphthoic acid, 3-hydroxy-2-naphthoic acid, 6-hydroxy-2-naphthoic acid, 6-methoxy-2-naphthoic acid and benzoic acid.

Application 4

In the ink composition, the molar ratio (aromatic compound/dye) of the aromatic compound to the dye may be in the range of 1 to 10.

Such an ink composition can be ejected stably from the nozzles of an ink jet printer when it is used in the ink jet printer.

Application 5

The ink composition may have a pH in the range of 8 to 10.5.

Such an ink composition does not corrode the parts of the printer nor easily cause clogging when it is used in an ink jet printer.

Application 6

A recording method according to an embodiment of the invention uses the above-described ink composition.

This method can produce a recorded article having a high light fastness.

Application 7

A recorded article according to an embodiment of the invention is produced by the above recording method.

The recorded article exhibits a high light fastness because of the presence of the above-described dye.

DESCRIPTION OF EXEMPLARY EMBODIMENTS

Embodiments of the invention will now be described. The following embodiments illustrate some forms of the invention. The invention is not limited to the following embodiments, and various modifications may be made within the scope and spirit of the invention. Also, all the components disclosed in the following embodiments are not required for the invention.

1. Ink Composition

The ink composition of an embodiment of the invention contains a dye, lithium ions, and an aromatic compound having a carboxy group.

1. 1. Dye

The dye contained in the ink composition of the present embodiment is expressed by the following formula (1) when it is in the form of a free acid. The dye may be ionized in the ink composition. In this instance, at least one of the —$SO_3H$ groups in formula (1) may be ionized into —$SO_3^-$ without limiting the counter ion. Although the free acid of the dye is expressed by formula (1), the dye may be in any form of an acid, an ion and a salt. In the following description, the dye whose free acid is expressed by formula (1) may be simply referred to as the dye.

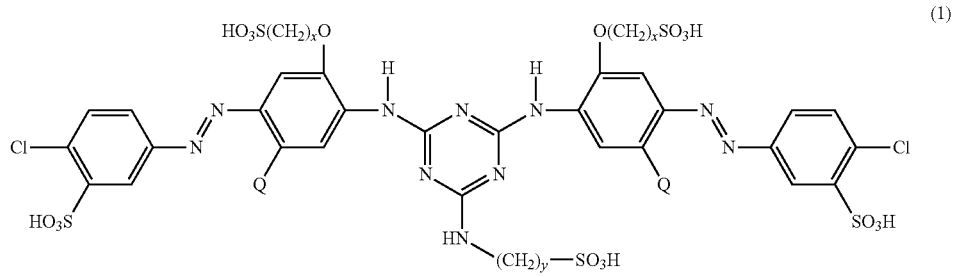

(In formula (1), Q represents a halogen atom, x represents an integer of 2 to 4, and y represents an integer of 1 to 3.)

The dye used in the present embodiment is water-soluble yellow coloring matter. When the dye is added to a solvent containing water, at least one of the five —$SO_3H$ groups is ionized into —$SO_3^-$, and thus the dye is present in the form of an ion in the solvent. All the five —$SO_3H$ groups of the dye may be ionized in a solvent containing water.

In formula (1), Q expresses a halogen atom. Halogen atoms include fluorine (F), chlorine (Cl), bromine (Br), and iodine (I). Among these, F or Cl is preferred, and Cl is particularly preferred. The structure of formula (1) has two Q's, and these may be the same or different.

In formula (1), x represents an integer in the range of 2 to 4. x Is appropriately set in view of the solubility of the dye in water, and is preferably 3. The structure of formula (1) has two x's, and these may be different.

In formula (1), y represents an integer in the range of 1 to 3. y Is appropriately set in view of the solubility of the dye in water, and is preferably 2.

The above-mentioned Q, x, and y can be appropriately set according to the solubility of the dye in water.

For example, the dye can be prepared as below. Q, x and y in the following formulas (3) to (8) each represent the same as in formula (1).

First, the compound expressed by formula (3) prepared from commercially available 2-amino-4-halogenophenol is converted into a sulfonic acid derivative (4) in accordance with the method disclosed in JPA-2004-75719, using sodium bisulfite and formalin. Subsequently, 5-amino-2-chlorobenzoic acid expressed by formula (5) is diazotized by a conventional method, and is then is subjected to a coupling reaction with the previously prepared sulfonic acid derivative (4) at a temperature of 0 to 15° C. and a pH of 2 to 4. The resulting product is further subjected to hydrolysis at a temperature of 80 to 95° C. and a pH of 10.5 to 11.5 to yield a compound expressed by formula (6).

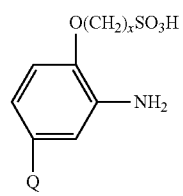

-continued

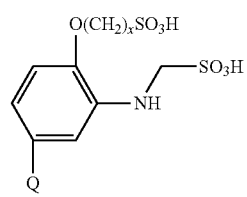

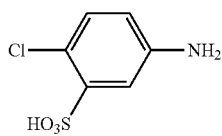
(5)

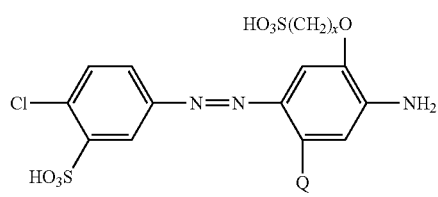
(6)

Subsequently, two equivalent of the compound of formula (6) and one equivalent of cyanuric halide, such as cyanuric chloride, are condensed at a temperature of 15 to 45° C. and a pH of 5 to 8 to produce a compound expressed by formula (7).

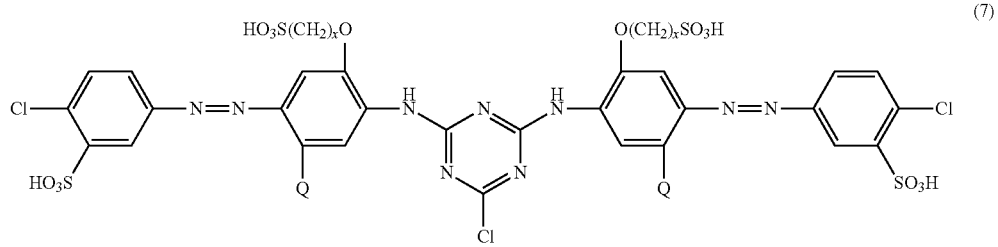
(7)

The chlorine of the triazine ring of the compound of formula (7) is substituted with an amine expressed by formula (8) at a temperature of 75 to 90° C. and a pH of 7 to 9, and thus the above-described dye is produced.

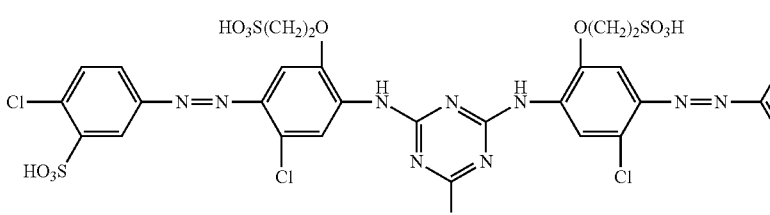
(8)

Examples of the amine expressed by formula (8) include aminomethylsulfonic acid, taurine (2-aminoethanesulfonic acid), and homotaurine (3-aminopropanesulfonic acid).

Examples of the dye that can be used in the present embodiment are shown in Table 1. Q, x and y shown in Table 1 each represent the same as in formula (1).

TABLE 1

| Compound No. | Q | x | y | Structural formula |
|---|---|---|---|---|
| 1 | Cl | 2 | 2 | 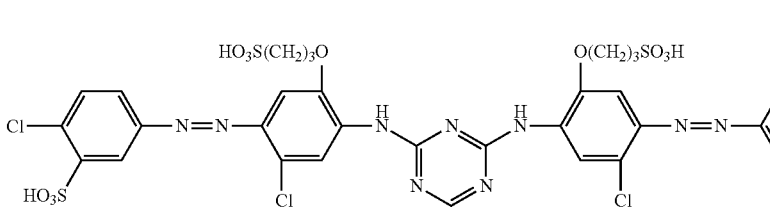 |
| 2 | Cl | 3 | 2 | 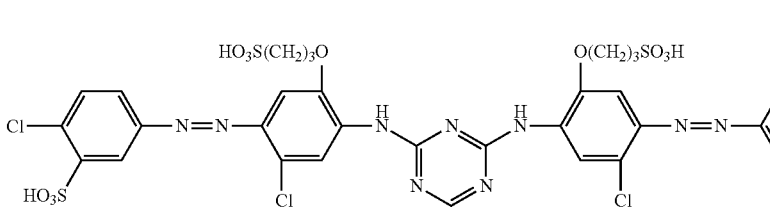 |

TABLE 1-continued

| Compound No. | Q | x | y | Structural formula |
|---|---|---|---|---|
| 3 | Cl | 4 | 2 | |
| 4 | Br | 3 | 2 | |
| 5 | F | 3 | 2 | |
| 6 | I | 3 | 2 | |
| 7 | Cl | 3 | 1 | |
| 8 | Cl | 3 | 3 | |

The form of the dye to be added in the ink composition may be a free acid expressed by formula (1) or a salt of the free acid. The dye in such a form can be added to the ink composition. If a salt of the free acid is added as the dye, the five —$SO_3H$ groups in the free acid each may independently form any one of the lithium salt, sodium salt, potassium salt, and ammonium salt.

Ammonium components that can form an ammonium salt with the —$SO_3H$ group may be $NH_4^+$ or an ammonium compound expressed by formula (9):

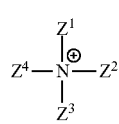

(9)

In formula (9), $Z^1$ to $Z^4$ are each hydrogen, an alkyl group having a carbon number of 1 to 4, hydroxyalkyl group having a carbon number of 1 to 4, or a hydroxy-alkoxy (carbon number: 1 to 4)-alkyl (carbon number: 1 to 4) group, and at least one of $Z^1$ to $Z^4$ is a group other than hydrogen.

Alkyl groups having a carbon number of 1 to 4 for $Z^1$ to $Z^4$ include methyl, ethyl, propyl, isopropyl, n-butyl, sec-butyl, and t-butyl. Hydroxyalkyl groups having a carbon number of 1 to 4 include hydroxymethyl, hydroxyethyl, 3-hydroxypropyl, 2-hydroxypropyl, 4-hydroxybutyl, 3-hydroxybutyl, and 2-hydroxybutyl. Similarly, hydroxy-alkoxy (carbon number: 1 to 4)-alkyl (carbon number 1 to 4) groups include hydroxyethoxymethy, 2-hydroxyethoxyethyl, 3-(hydroxyethoxy)propyl, 3-(hydroxyethoxy)butyl, and 2-(hydroxyethoxy)butyl.

A free acid expressed by formula (1) of the dye or its salt can be prepared, for example, by the following method. For example, an organic solvent, such as acetone or an alcohol having a carbon number of 1 to 4, or sodium chloride may be added to the reaction liquid after the completion of the process for synthesizing the dye to precipitate a sold. The solid is filtered to yield a wet cake of, for example, a sodium salt of the dye. The resulting wet cake of the sodium salt may be dissolved in water, and an acid, such as hydrochloric acid, is added to the solution of the cake to adjust the pH. The thus precipitated solid is filtered to yield a dye in the form of a free acid or a compound part of which is a sodium salt.

The resulting sodium salt wet cake or the dried solid of the cake may be dissolved in water. After an ammonium salt, such as ammonium chloride, is added to the solution of the cake, an acid, such as hydrochloric acid, is further added to adjust the pH to 1 to 3, and the thus precipitated solid is filtered to yield an ammonium salt of the dye.

Alternatively, a mineral acid, such as hydrochloric acid or sulfuric acid, may be added to the reaction liquid after the completion of the reaction to yield directly a solid of the dye, as will be described later. The solid of the dye, or wet cake of the dye, may be turned into a salt, such as potassium, lithium, ammonium or an organic ammonium salt, by adding a hydroxide, such as potassium hydroxide, lithium hydroxide, ammonia water, or a hydroxide of an organic ammonium compound of formula (9).

In this instance, by controlling the molar ratio of hydroxides to the dye, a mixed salt can be prepared, such as a mixed salt of a lithium salt and a sodium salt, or of a lithium salt, a sodium salt and an ammonium salt. By preparing a salt of the dye, the physical properties of the dye, such as solubility, and the capability of the ink composition containing the salt can be varied according to the salt. Preferably, the dye is added in the form of a salt from the viewpoint of the solubility in water.

The reaction liquid after the completion of the process for synthesizing the dye may be directly used in the process for preparing the ink composition. Alternatively, after synthesis, the dye or its salt may be separated from the reaction liquid by drying the reaction liquid by spray drying or the like, and thus, a dried form of the dye or its salt may be added to the ink composition. When the dye is thus added to the ink composition, it is preferable the reaction liquid or isolate contain little inorganic salt, such as sodium chloride and other metal chlorides and sodium sulfate and other sulfates. For example, the total amount of sodium chloride and sodium sulfate is preferably 1% by mass or less relative to the total amount of the dye, and more preferably the lower limit is 0% by mass, that is, lower than or equal to the detection limit of the detector. In order to obtain a reaction liquid or an isolate containing little inorganic salt, for example, inorganic salts may be separated through a known reverse osmosis membrane, or the reaction liquid may be purified or crystallized in a water-soluble organic solvent, such as acetone or an alcohol having a carbon number of 1 to 4, or a water-containing water-soluble organic solvent. Demineralization can be performed by either method.

The dye content in the ink composition can be appropriately set in view of the dye and solvent used. Preferably, the ink composition contains ions formed by ionizing at least one of the five —$SO_3H$ groups of the dye into —$SO_3^-$ in an amount of 0.1% to 10% by mass, more preferably, 0.5% to 5% by mass relative to the total mass of the ink composition. By setting the ion content in such a range, the ink composition can exhibit a high color developability on a recording medium or can form high-density images on a recording medium, while ink clogging does not easily occur.

The ion formed by ionizing at least one of the five —$SO_3H$ groups of formula (1) into —$SO_3^-$ has a high solubility in water. Consequently, the dye becomes difficult to separate out of the ink composition. Hence, the dye can function to reduce the degree of clogging nozzles and pen tips. The dye will be present in the form of an acid or a salt in the coating of the ink composition after images or the like formed with the ink composition are dried. In other words, the image or the like contains the dye or its salt. Since the dye or its salt has a high light fastness, the dye contained in an ink composition also functions to enhance the light fastness of images formed with the ink composition. The functions of the dye described herein may be achieved because of the presence of other components, such as lithium ions and the aromatic compound having a carboxy group, together with the dye.

1. 2. Lithium Ion

The ink composition of the present embodiment contains lithium ions. The Lithium ion is expressed by the chemical formula $Li^+$.

One of the functions of the lithium ions is to increase the solubility of the dye in the ink composition. Consequently, the ink composition does not easily clog nozzles or pen tips.

The lithium ion content in the ink composition is 0.1% to 20% by mass, preferably 1% to 10% by mass, and more preferably 2% to 8% by mass, relative to the total mass of the ink composition.

Lithium ions can be added to the ink composition by any method without particular limitation. For example, a form in which at least one of the five —$SO_3H$ groups of the free acid of the dye forms a lithium salt may be added to the ink composition. From the viewpoint of increasing the solubility of the dye, an inorganic lithium compound, such as lithium hydroxide, lithium chloride, lithium fluoride, or lithium carbonate, is preferably added to prepare the ink composition, in addition to a free acid of the dye expressed by formula (1) or its salt. Thus, an ink composition that does not easily cause clogging can be prepared independently of the form of the dye (a free acid or a salt). An inorganic lithium compound may be added in combination with a free acid of a below-described aromatic compound having a carboxy group. This allows easy adjust of the pH of the ink composition.

1. 3. Aromatic Compound Having Carboxy Group

The ink composition of the present embodiment contains an aromatic compound having a carboxy group. The carboxy group is expressed by the chemical formula —COOH. The aromatic compound can have any aromatic ring without particular limitation.

Exemplary aromatic rings include monocyclic hydrocarbon rings, such as benzene ring; condensed polycyclic hydrocarbon rings, such as rings of naphthalene, anthracene, indene, biphenylene, fluorene, phenanthrene, and pyrene; and heterocyclic rings formed by substituting, for example, sulfur or nitrogen for one or more members of those aromatic rings. The aromatic ring may not be in a conjugated form as a whole, or may form a polycyclic aggregate. Also, the aromatic ring may have a structure in which two or more aromatic rings are bound to each other with one or more methylene bonds, ether linkages, sulfide bonds, sulfonyl bonds or the like.

The aromatic compound having a carboxy group may have another functional group. The functional group may be organic or inorganic, and examples of such a functional group include hydroxy, alkyl having a carbon number of 1 to 8, alicyclic alkyl having a carbon number of 1 to 8, alkoxy having a carbon number of 1 to 8, ester, acyl, oxo, mercapto, thioxo, halogen, amino, and azo.

The aromatic compound may have two or more carboxy groups, and may also have two or more functional groups other than the carboxy group.

Examples of the aromatic compound having one or more carboxy groups include benzoic acid, mandelic acid, phthalic acid, naphthoic acids such as 1-naphthoic acid and 2-naphthoic acid, naphthylic acid such as 2,6-naphthalenedicarboxylic acid, naphthylacetic acid, naphthoxyacetic acid, hydroxybenzoic acids such as salicylic acid and 4-hydroxybenzoic acid, hydroxynaphthoic acids such as 2-hydroxy-1-naphthoic acid, 1-hydroxy-2-naphthoic acid, 3-hydroxy-2-naphthoic acid, and 6-hydroxy-2-naphthoic acid, and alkoxynaphthoic acids such as 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, 6-methoxy-2-naphthoic acid, and 6-propoxy-2-naphthoic acid, and salts of these aromatic compounds.

One of the functions of the aromatic compound is to enhance the moisture fastness of the recorded article. It is not clear how the aromatic compound performs this function. Since the solubility of the aromatic compound having a carboxy group is low, bleeding caused by humidity may not occur in the resulting recorded article. The ink composition of the present embodiment contains an aromatic compound having a carboxy group and lithium ions in combination. This allows the ink composition to produce a recorded article having a high moisture fastness without easily causing clogging.

The aromatic compound may be added in the form of a salt to the ink composition. A free acid of the aromatic compound and a base may be added independently to the ink composition. The salt of the aromatic compound may be a metal salt or an ammonium salt without being limited to salts formed with counter ions of the structure. Alkali metal salts are particularly preferred.

The content of the aromatic compound or its salt is determined depending on the types of the aromatic compound or it salt, the dye, and the solvent, and is preferably 0.1% to 10% by mass, more preferably 0.5% to 10% by mass, relative to the total mass of the ink composition.

When the aromatic compound is added to the ink composition, the aromatic compound may be in the form of a free acid or a salt in which at least one of the carboxy groups of the aromatic compound forms a salt. The ink composition thus contains the aromatic compound having one or more of carboxy groups. If a salt of the aromatic compound is added, the carboxy groups of the aromatic compound each may independently form a lithium salt, a sodium salt, a potassium salt, or an ammonium salt. The ammonium component to form an ammonium salt with the carboxy group may be $NH_4^+$ or an ammonium compound expressed by formula (8). If at least one of the carboxy groups of the aromatic compound forms a lithium salt, lithium ions can be easily introduced to the ink composition, and, in addition, the pH of the ink composition can be easily adjusted.

The content of the aromatic compound is determined depending on the types of the aromatic compound, the dye, and the solvent, and is preferably 0.2% to 10% by mass, more preferably 0.5% to 5% by mass, relative to the total mass of the ink composition.

1. 4. Other Constituents

The ink composition contains water as a solvent, and further contains a color material, an organic solvent, a surfactant and other additives as needed.

1. 4. 1. Water

The water added to the ink composition may be pure water or ultrapure water, such as ion exchanged water, ultrafiltered water, reverse osmotic water, or distilled water. In addition, the ink composition may further contain a modifier of other ions, and impurities, as long as such components do not interfere with the dispersion of ions or the like.

The water content in the ink composition is not particularly limited as long as the constituents of the ink composition can be dispersed or dissolved, and is preferably in the range of 50% to 95% by mass relative to the total mass of the ink composition. When the water content is in this range, the ink composition does not easily cause clogging.

1. 4. 2. Another Color Materials

The ink composition may contain a known color material for adjusting the hue in such a degree as not to hinder an advantageous effect from being produced. Such a color material may be a pigment or a dye. Known yellow dyes include C.I. Direct Yellows 34, 58, 86, 132 and 173, C.I. Direct Oranges 26, 29 and 49, and C.I. Direct Reds 62, 75, 79, 80 and 84. If the ink composition contains these dyes, the ink composition may become liable to cause clogging. Preferably, these color materials, if used, are accessorily used in such an amount in which clogging does not easily occur.

1. 4. 3. Organic Solvent

The ink composition may contain an organic solvent. The organic solvent may be soluble in water. By adding a water-soluble organic solvent, the ink composition can be ejected more stably, and the viscosity of the ink composition can be easily varied without changing the other characteristics of the ink composition. Examples of the organic solvent include alcohols having a carbon number of 1 to 4, such as methanol, ethanol, n-propanol, isopropanol, n-butanol, isobutanol, s-butanol, and t-butanol; amides, such as N,N-dimethylformamide and N,N-dimethylacetamide; heterocyclic ketones, such as 2-pyrrolidone, N-methyl-2-pyrrolidone, hydroxyethyl-2-pyrrolidone, 1,3-dimethylimidazolidine-2-one, and 1,3-dimethylhexahydropyrimido-2-one; ketones and ketoalcohols, such as acetone, methyl ethyl ketone, 2-methyl-2-hydroxypentane-4-one, and acetonylacetone; cyclic ethers, such as tetrahydrofuran and dioxane; monoalkylene glycols, oligoalkylene glycols, polyalkylene glycols (polyhydric alcohols) including an alkylene unit having a carbon number of 2 to 6, and thioglycols, such as ethylene glycol, glycerol, 1,2- and 1,3-propylene glycols, 1,2-, and 1,4-butylene glycols, 1,6-hexylene glycol, pentanediol, 2-butene-1,4-diol, 2-methyl-2,4-pentanediol, 1,2,6-hexanetriol, diethylene glycol, triethylene glycol, tetraethylene glycol, dipropylene glycol polyethylene glycol, and polypropylene glycol; polyols (preferably triols), such as trimethylolpropane, glycerol, and hexane-1,2,6-triol; glycol ethers (monoalkyl ethers of polyhydric alcohols, having a carbon number of 1 to 4), such as ethylene glycol monomethyl ether, ethylene glycol monobutyl ether, diethylene glycol monomethyl ether, diethylene glycol monoethyl ether, diethylene glycol monobutyl ether (butyl Carbitol), triethylene glycol monomethyl ether, triethylene glycol monoethyl ether, propylene glycol monomethyl ether, dipropylene glycol monoethyl ether, propylene glycol monobutyl ether, dipropylene glycol monobutyl ether, and triethylene glycol monobutyl ether; esters, such as γ-butyrolactone and triethyl phosphate; furfuryl alcohol; tetrahydrofurfuryl alcohol; thiodiglycol; trimethylglycine; and dimethyl sulfoxide.

These organic solvents include materials that are solid at room temperature, such as trimethylolpropane and trimethylglycine. However, they are soluble in water, and their aqueous solutions are likely to produce the same effect as water-soluble organic solvents.

Among the above-cited organic solvents, glycol ethers can be used as penetration enhancers. By adding a glycol ether to the ink composition, the penetration of the ink composition into the recording medium can be enhanced. In addition, when color recording is performed, the degree of bleeding can be reduced between adjacent color inks on the recording medium, and, consequently, clearer images can be formed.

Among the above organic solvents, polyhydric alcohols, ketones, esters, furfuryl alcohol, tetrahydrofurfuryl alcohol, thiodiglycol, and trimethylglycine exhibit high moisture-retaining property because they have lower vapor pressures than water or are solid at room temperature and therefore less volatile. Thus, these organic compounds are likely to be used as a moisturizing agent. By adding such an organic solvent to the ink composition, it is expected to suppress the evaporation of water from the ink composition.

Other moisturizing agents may be suitably used, such as maltitol, sorbitol, gluconolactone, maltose and other saccharides.

When an organic solvent or organic solvents are added to the ink composition, the organic solvent content is preferably 3% to 50% by mass in total, relative to the total mass of the ink composition. Preferably, the total organic solvent content is 5% to 30% by mass in view of the viscosity and moisture-retaining property of the ink composition and the penetration of the ink composition into the recording medium, and allowing for bleeding.

1. 4. 4. Surfactant

The ink composition of the present embodiment may contain a surfactant. The surfactant can be selected from the known anionic surfactants, amphoteric surfactants, cationic surfactants, and nonionic surfactants.

Exemplary anionic surfactants include alkyl sulfocarboxylates, α-olefin sulfonates, polyoxyethylene alkyl ether acetate, N-acylamino acid and its salts, N-acylmethyltaurine salts, alkyl sulfate polyoxyalkyl ether sulfates, alkyl sulfate polyoxyethylene alkyl ether phosphates, rosin acid soap, Castor oil sulfates, lauryl alcohol sulfuric ester salts, alkylphenol phosphates, alkylphosphates, alkylaryl sulfonates, diethyl sulfosuccinates, diethylhexyl sulfosuccinates, and dioctyl sulfosuccinates. A lithium salt of any one of these anionic surfactants may be added to introduce lithium ions to the ink composition.

Exemplary cationic surfactants include 2-vinylpyridine derivatives and poly(4-vinylpyridine) derivatives.

Exemplary amphoteric surfactants include betaine lauryldimethylaminoacetate, 2-alkyl-N-carboxymethyl-N-hydroxyethyl imidazolinium betaine, coconut oil fatty acid amidopropyldimethylaminoacetic acid betaine, polyoctylpolyaminoethylglycine, and imidazoline derivatives.

Exemplary nonionic surfactants include ethers, such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ethers; esters, such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetyleneglycols (alcohols), such as 2,4,7,9-tetramethyl-5-decyne-4,7-diol, 3,6-dimethyl-4-octyne-3,6-diol, and 3,5-dimethyl-1-hexyne-3-ol; commercially available products of Nissin Chemical Industry, such as Surfynols (registered trademark) 104, 82 and 465, and Olfines (registered trademark) STG and PD-002W (acetylene diol-based); and Tergitol (registered trademark) 5-S-7 produced by SIGMA-ALDRICH.

The surfactant added to the ink composition may have an antifoaming function as well as the function of reducing interfacial tension. Examples of such a surfactant include highly oxidized oil-based surfactants, glycerin fatty acid ester-based surfactants, fluorine-containing surfactants, silicone-based surfactants, and acetylene diol-based surfactants.

1. 4. 5. Additives

The ink composition may further contain known additives, such as preservatives or antifungal agents, pH adjusters, chelating reagents, rust preventives, ultraviolet absorbents, viscosity modifiers, solubilizing agents, and discoloration preventives.

Exemplary preservatives or antifungal agents include organic sulfurs, organic nitrogen-sulfur compounds, organic halogen compounds, haloallyl sulfones, iodopropargyl compounds, N-haloalkylthio compounds, benzothiazoles, nitrile compounds, pyridine compounds, 8-oxyquinoline compounds, isothiazoline compounds, dithiol compounds, pyridinoxide compounds, nitropropane compounds, organic tin compounds, phenol-based compounds, quaternary ammonium salt-based compounds, triazine-based compounds, thiadiazin-based compounds, anilide compounds, adamantane compounds, dithiocarbamate compounds, brominated indanone compounds, benzyl bromoacetate compounds, and inorganic salts-based compounds. The organic halogen compound may be sodium pentachlorophenol. The pyridinoxide compound may be sodium 2-pyridinethiol-1-oxide. Exemplary isothiazoline compounds include 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesium chloride, 5-chloro-2-methyl-4-isothiazolin-3-one calcium chloride, and 2-methyl-4-isothiazolin-3-one calcium chloride. Other preservatives or antifungal agents may be used, such as sodium acetate, sodium sorbate, and sodium benzoate. Commercially available preservatives or antifungal agents may also be used, such as Proxel (registered trademark) GXL(S) and Proxel XL-2(S), each produced by Arch Chemicals.

Exemplary pH adjusters include alkanolamines, such as diethanolamine and triethanolamine; alkali metal hydroxides, such as lithium hydroxide, sodium hydroxide, and potassium hydroxide; ammonium hydroxide; alkali metal carbonates, such as lithium carbonate, sodium carbonate, potassium carbonate; and aminosulfonic acids, such as taurine. Among these pH adjusters, lithium hydroxide and lithium carbonate can introduce lithium ions to the ink composition, as well as adjusting the pH.

Exemplary chelating reagents include disodium ethylenediaminetetraacetate, trisodium nitrilotriacetate, trisodium hydroxyethylethylenediaminetriacetate, sodium diethylenetriaminepentaacetate, and sodium uracil diacetate.

Exemplary rust preventives include acid sulfites, sodium thiosulfate, ammonium thioglycolate, diisopropyl ammonium nitrite, pentaerythritol tetranitrate, and dicyclohexyl ammonium nitrite.

Exemplary ultraviolet absorbents include benzophenone compounds, benzotriazole compounds, cinnamic acid compounds, triazine compounds, and stilbene compounds. Also, fluorescent brightening agents, such as benzoxazole compounds, may be used which absorb ultraviolet light to emit fluorescence.

Viscosity modifiers include the above-mentioned organic solvents, and water-soluble polymer compounds, such as polyvinyl alcohol, cellulose derivatives, polyamine, and polyimine.

Exemplary solubilizing agents include urea, ϵ-caprolactam, ethylene carbonate, 1,3-dimethyl-2-imidazolidinone, 2-pyrrolidone, and N-methyl-2-pyrrolidone. By adding a solubilizing agent to the ink composition, the solubility of the dye or its salt can be increased.

The discoloration preventive may be an organic compound or a metal complex. Organic discoloration preventives include hydroquinones, alkoxyphenols, dialkoxyphenols, phenols, anilines, amines, indanes, chromanes, alkoxyanilines, and heterocyclic compounds. Metal complex discoloration preventives include nickel complexes and zinc complexes. By adding a discoloration preventive to the ink composition, the degree of discoloration (color fading) of images formed with the ink composition can further be reduced.

1. 5. Chemical Properties of Ink Composition

In the ink composition of the present embodiment, the molar ratio of the aromatic compound having a carboxy group to the dye whose free acid is expressed by formula (1) (aromatic compound/dye) is preferably in the range of 1 to 10. More preferably, the ratio is in the range of 1.5 to 7 from the viewpoint of the moisture fastness of the resulting recorded article produced using the ink composition.

In addition, the pH of the ink composition is preferably 8.0 to 10.5, and more preferably 8.5 to 10.0. If the ink composition is acid (with a pH of about less than 5), the solubilities of the dye and the aromatic compound can be reduced. In addition, the container or the like in which the ink composition is to be stored may be corroded. When the pH of the ink composition is 8.0 to 10.5, these problems do not easily occur.

Preferably, the surface tension of the ink composition is adjusted to 25 to 45 mN/m at 20° C. Also, the viscosity of the ink composition is preferably adjusted to 10 mPa·s or less from a viewpoint of facilitating the ejection of the ink composition from nozzles of an ink jet apparatus.

1. 6. Application

The ink composition of the present embodiment can be used for dying natural and synthetic fiber materials and blended materials, and for printing, copying, marking, writing, drafting, stamping and recording. Since the ink composition of the present embodiment does not easily precipitate solid even if it is dried, and hence the ink composition does not clog the recording head particularly of ink jet printers, the ink composition is particularly suitable for ink jet printers.

1. 7. Preparation of Ink Composition

The ink composition can be prepared by mixing the above-described constituents and stirring the mixture. The constituents may be dissolved in any order without particular limitation. After preparation, the ink composition may be filtered through a membrane filter or the like to remove foreign matter. For using the ink composition as an ink jet ink, the ink composition may be subjected to microfiltration. The filter used for microfiltration may have a pore size of 0.1 to 1 µm.

1. 8. Advantages

The ink composition of the present embodiment does not easily cause clogging when being used in an ink jet printer, mainly because of the presence of lithium ions, and exhibits a high light fastness because of the presence of the dye whose free acid is expressed by formula (1). The ink composition can be ejected stably from the nozzles of an ink jet printer when the ink composition is used in the ink jet printer. In addition, the ink composition does not corrode the parts of an ink jet printer nor easily cause clogging when it is used in the ink jet printer.

Also, the ink composition can be stably stored for a long time without precipitating solid matter or changing properties and hues. Furthermore, since the dye whose free acid is expressed by formula (1) is superior in solubility in water and water-soluble organic solvents, the ink composition can be easily filtered through, for example, a membrane filter.

Also, the ink composition, which can be stably stored, is suitably used in a continuous ink jet printer, for example, when it is used for a relatively long time while being recycled, or even when it is intermittently used in on-demand ink jet printers.

2. Recorded Article and Recording Method

The recorded article of an embodiment of the invention includes an image formed on a recording medium.

The recorded article is formed with the above-described ink composition. The recorded article is produced by depositing an ink composition on a recording medium by a variety of methods. The method for depositing the ink composition on a recording medium is not particularly limited. For example, the ink composition may be deposited by dip coating, spray coating, dip dyeing, printing such as screen printing, or ink jet recording. Preferably, the ink composition is deposited on a recording medium by being ejected in the form of droplets from a container mounted on a predetermined position of an ink jet printer through nozzles according to signals for recording. A piezoelectric type or a bubble jet (registered trademark) type may be used as such an ink jet printer.

The recording medium is not particularly limited as long as an ink composition can be applied onto the medium. Examples of the recording medium onto which the ink composition of an embodiment of the invention is applied to from an image (coating) include sheets of paper or films, fibers or cloths such as cellulose, nylon and wool, leather, glass plates, and color filter substrates. Examples of the sheet include, but are not limited to, plain paper and surface-treated sheets, such as media having an ink receiving layer on a base material of, for example, paper, synthetic paper, or a film. The ink receiving layer is intended, for example, to absorb the ink composition to promote drying. The ink receiving layer can be formed, for example, by impregnating a base material with a cationic polymer, applying a cationic polymer to a base material, or applying inorganic particles and a hydrophilic polymer, such as polyvinyl acetal or polyvinyl pyrrolidone, to the surface of a base material. The inorganic particles may be made of porous silica, alumina sol, or a special ceramic. Examples of such a sheet having an ink receiving layer include ink jet paper, ink jet film, glossy paper, and glossy film. Some sheets having an ink receiving layer are commercially available, and examples include Photo Paper CRISPIA (highly glossy) and Photo Paper (Glossy), each manufactured by Seiko Epson Corp.; professional photographic papers Photo Paper Pro Platinum and Photo Pater Plus Glossy 2, each manufactured by Canon Inc.; Advanced Glossy Photo Paper manufactured by Hewlett Packard; KASSAI Photofinish Pro manufactured by Fujifilm Corporation; and Glossy Photo Paper BP7IG manufactured by Brother Industries, Ltd. Plain paper does not have an ink receiving layer, and various types are available for various uses. Examples of commercially available plain paper include double-sided high-quality plain paper manufactured by Seiko Epson Corp., PB PAPER GF-500 manufactured by Canon Inc., and Multipurpose Paper All-in-one Printing Paper manufactured by Hewlett Packard. PPC (plain paper copier) paper, whose use is not limited to ink jet recording, may be used as plain paper.

The recorded article of the present embodiment exhibits a high light fastness mainly because of the presence of the dye whose free acid is expressed by formula (1). The recorded article may contain the above-described dye, lithium ions and an aromatic compound having a carboxy group. Accordingly, the light fastness of the recorded article is superior because of the total contribution of these compounds and ions.

Also, the recorded article of the present embodiment can have a clear, dense yellow image having a high saturation and good hue on a recording medium. In the recorded article of the present embodiment, a color photographic image can be reproduced correctly on paper, and the image can be stored for a long time without discoloration. Also, the recording method of an embodiment of the invention can produce a recorded article in which a photographic color image has been reproduced, and the image can be stored for a long time without discoloration.

In the recorded article of the present embodiment, an image exhibiting a high light fastness can be produced because of the present of the above-described dye. Hence, the recorded article of the present embodiment has a recorded image having a color saturation and a high light fastness, and particularly in a good balance between color saturation and light fastness. In the recorded article, thus, discoloration does not easily occur and can be stably stored when photographic images are formed.

3. Examples and Comparative Examples

Examples and Comparative Examples are described in detail, but the Examples do not limit the scope of the invention.

3. 1. Ink Composition

Ink compositions of the Examples were prepared as below. In the description of the Examples, part(s) and percent are on a mass basis, and reaction was conducted at room temperature. The solubilities in water of the compound used in Examples were each 100 g/L or more.

Compounds used in Examples 1 to 7 and Comparative Examples 1 to 4 were prepared as below.

In 200 parts of water was dissolved 20.8 parts of 5-amino-2-chlorobenzenesulfonic acid while the pH was being adjusted to 6 with sodium hydroxide. Then, 7.2 parts of sodium nitrite was added. The solution was dropped into 20 parts of 5% hydrochloric acid solution at a temperature of 0 to 50° C. over a period of 30 minutes, and the liquid was stirred at 10° C. or less for an hour for diazotization to yield a diazotized solution.

In another vessel, 26.6 parts of 2-(sulfopropoxy)-5-chloroaniline was dissolved in 130 parts of water while the pH was being adjusted to 7 with sodium hydroxide, and the solution was subjected to a reaction to produce a methyl-ω-sulfonic acid derivative using 10.4 parts of sodium bisulfite and 8.6 parts of 35% formalin. The resulting methyl-ω-sulfonic acid derivative was added to the previously prepared diazotized solution, and the mixture was stirred at a temperature of 0 to 15° C. and a pH of 2 to 4 for 24 hours. The reaction liquid was adjusted to a pH of 11 with sodium hydroxide, and was stirred at 80 to 95° C. for 5 hours with the pH maintained. Then, 100 parts of sodium chloride was added to precipitate a salt. The precipitated solid was separated out by filtration, and thus 100 parts of wet cake of an azo compound expressed by formula (10) was obtained.

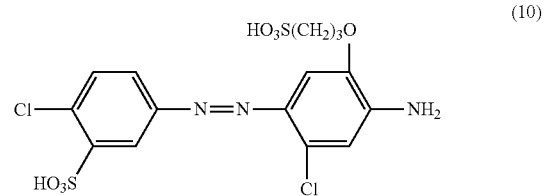

(10)

In 250 parts of ice water was added 0.10 parts of surfactant LEOCOL (registered trademark) TD90 produced by Lion Corporation, and the liquid was vigorously stirred. Then, 3.6 parts of cyanuric chloride was added to the liquid and stirred at 0 to 5° C. for 30 minutes to yield a suspension. Subsequently, 100 parts of the wet cake of the compound of formula (10) was dissolved in 200 parts of water, and the suspension was dropped into the solution of the wet cake over a period of 30 minutes. After dropping the suspension, the liquid was stirred at a pH of 6 to 8 and a temperature of 25 to 45° C. for 6 hours. To the resulting liquid was added 37.5 parts of taurine. The mixture was stirred at a pH of 7 to 9 and a temperature of 75 to 90° C. for 4 hours. The resulting reaction mixture was cooled to 20 to 25° C., and 800 parts of acetone was added to the reaction mixture, followed by stirring at a temperature of 20 to 25° C. for 1 hour. The precipitated solid was filtered to yield 50.0 parts of wet cake. The resulting wet cake was dried at 80° C. with hot air drying equipment to yield 13.5 parts of sodium salt of the water-soluble azo compound (λmax: 408 nm) expressed by formula (11). This compound is called "color material A." Color material A is equivalent to a yellow dye.

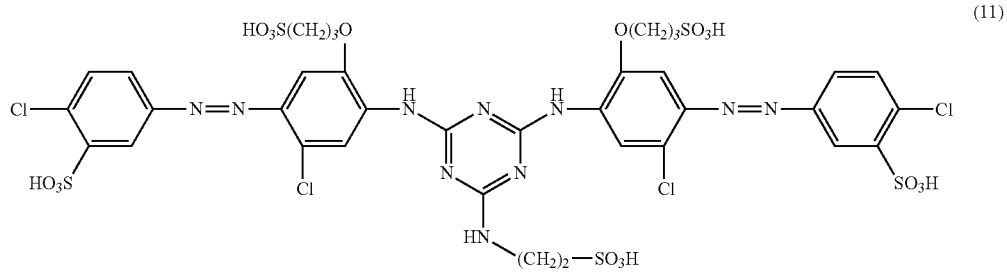

(11)

Preparation of Ink Compositions

The ink compositions of Examples 1 to 7 and Comparative Examples 1 to 4 were prepared using the above-described color material A with other compounds according to the compositions shown in Table 3. The ink compositions of Comparative Examples 5 to 8 were prepared using C. I. Direct Yellows 173, 132 and 86 singly or in combination and other compounds according to the compositions shown in Table 3.

Each ink composition was filtered to remove foreign matter through a 0.45 μm membrane filter. The pH of each ink composition was measured with a commercially available pH meter, and the results are shown in Table 3. The contents of the constituents of each ink composition shown in Table 3 are on a percent-by-mass basis relative to the total mass of the ink composition, and the water content is the balance of the composition.

3. 2. Evaluations of Ink Compositions

Clogging

The ink compositions of the Examples and Comparative Examples were each placed in a cartridge (magenta chamber) of an ink jet printer PM-G800 (manufactured by Seiko Epson Corp.), and a solid image was continuously recorded on an ink jet recording medium (Photo Paper (Glossy): KA420PSKR manufactured by Seiko Epson Corp.) for 10 minutes. After ensuring that the ink composition was ejected from all nozzles, the recording head with the ink cartridge was allowed to stand at 40° C. for two weeks with the head cap removed so as to accelerate the drying of the nozzles. Then, cleaning operation was repeated until all nozzles ejected the ink composition to the same extent as in the early stage. Thus, the ease of the recovery of the ejection was evaluated accord-

TABLE 3

| | | Example | | | | | | | Comparative Example | | | | | | | |
|---|---|---|---|---|---|---|---|---|---|---|---|---|---|---|---|---|
| | (mass %) | 1 | 2 | 3 | 4 | 5 | 6 | 7 | 1 | 2 | 3 | 4 | 5 | 6 | 7 | 8 |
| Color material | Color material A | 4 | 4 | 4 | 4 | 4 | 4 | 4 | 4 | 4 | 4 | 4 | — | — | — | — |
| | C.I. Direct Yellow 173 | — | — | — | — | — | — | — | — | — | — | — | 3.6 | — | 3.6 | — |
| | C.I. Direct Yellow 132 | — | — | — | — | — | — | — | — | — | — | — | — | 1.86 | — | 1.86 |
| | C.I. Direct Yellow 86 | — | — | — | — | — | — | — | — | — | — | — | — | 1.93 | — | 1.93 |
| Organic solvent | Glycerol | 9 | 9 | 9 | 9 | 9 | 9 | 9 | 9 | 9 | 9 | 9 | 9 | 9 | 9 | 9 |
| | Trimethylglycine | — | — | — | — | — | 5 | — | — | — | — | — | — | — | — | — |
| | Triethylene glycol | 8 | 8 | 8 | 8 | 8 | 8 | 8 | 8 | 8 | 8 | 8 | 8 | 8 | 8 | 8 |
| Solubilizing agent | Urea | 5 | 5 | 5 | 5 | 5 | — | 5 | 5 | 5 | 5 | 5 | 5 | 5 | 5 | 5 |
| Surfactant | Olfine PD-002W | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| pH adjuster | Sodium hydroxide | — | — | — | — | — | — | — | — | — | 0.22 | — | — | — | — | — |
| | Lithium hydroxide (monohydrate) | 0.1 | 0.5 | 1 | 0.5 | 0.5 | 0.5 | 0.5 | — | — | — | 0.5 | — | — | 0.5 | 0.5 |
| Aromatic compound having carboxy group | 2-Naphthoic acid | 1 | 2 | 4 | — | — | 1 | — | — | 2 | 2 | — | — | — | 1 | 1 |
| | 3-Hydroxy-2-naphtoic acid | — | — | — | 2 | — | — | — | — | — | — | — | — | — | — | — |
| | 6-Hydroxy-2-naphtoic acid | — | — | — | — | 2 | — | — | — | — | — | — | — | — | — | — |
| | Benzoic acid | — | — | — | — | — | — | 0.7 | — | — | — | — | — | — | — | — |
| | Water | Balance | Balance | Balance | Balance | Balance | Balance | Balance | Balance | Balance | Balance | Balance | Balance | Balance | Balance | Balance |
| Evaluation | PH | 8.5 | 8.5 | 8.5 | 8.5 | 8.5 | 8.5 | 8.5 | 8.8 | 7 | 8.5 | 12.5 | 9.1 | 9 | 9.1 | 9 |
| | Clogging resistance | B | A | A | A | A | A | A | D | D | D | A | B | B | A | A |
| | Light fastness | A | A | A | A | A | A | A | A | A | A | C | C | D | C | D |
| | Moisture fastness | A | A | A | A | A | A | B | B | A | A | B | B | B | A | A | ing to the following criteria, and the results are shown in Table 3.

A: Faulty recording, such as fading or missing, was resolved by one to five cleaning operations.

B: Faulty recording, such as fading or missing, was resolved by six to ten cleaning operations.

C: Faulty recording, such as fading or missing, was resolved by 11 to 15 cleaning operations.

D: Faulty recording, such as fading or missing, was not resolved even by 16 cleaning operations or more.

3. 3. Light Fastness of Image

Recording was performed at a duty adjusted so that the optical density (OD) of the ink composition could be in the range of 0.9 to 1.1, using the above-described printer, cartridge and recording medium. The resulting recorded article was allowed to stand for one day under the conditions at room temperature and normal humidity where the article was not exposed direct sunlight, and the light fastness of the recorded article was evaluated under the following conditions.

The recorded article was exposed to light at an illuminance of 70,000 lux at 24° C. and 60% RH for 7 days using a fluorescent light fastness tester SFT-II (manufactured by Suga Test Instruments).

The OD values of the exposed samples were measured with a spectrophotometer Spectrolino manufactured by Gretag. The relict optical density (ROD) after discoloration was calculated by substituting the above measurements in the following equation:

$$ROD (\%) = (D_n/D_0) \times 100$$

where $D_n$ represents the OD value after the exposure test, and $D_0$ represents the OD value before the exposure test.

The resulting ROD values were plotted on the vertical axis against the test period (days) on the horizontal axis to prepare an approximated curve. The period for which the ROD value was reduced to 70% was obtained from the approximated curve. The light fastness was evaluated according to the following criteria and the results are shown in Table 3.

A: ROD≥90%

B: 80%≤ROD<90%

C: 70%≤ROD<80%

D: ROD<70%.

3. 4. Moisture Fastness of Image

Hollow characters (font type: MS Gothic, font size: 14 and 18, formed by depositing ink in the regions other than the characters) were recorded with the ink composition on the above recording medium using the above-described printer and cartridge. The resulting image was allowed to stand at 40° C. and 85% RH for 3 days. Then, the moisture fastness was evaluated by visual observation according to the following criteria, and the results are shown in Table 3.

A: Bleeding was not observed in the hollow portions.

B: Although the characters were legible, but bleeding was observed.

3. 5. Evaluation Results

Table 3 shows that Examples 1 to 7, each containing color material A, lithium hydroxide, and an aromatic compound having a carboxy group, that is, containing a dye whose free acid is expressed by formula (1), lithium ions, and an aromatic compound having a carboxy group, exhibited high light fastness and high resistance to clogging. The ink compositions of Examples 1 to 7 each have good balance between the light fastness and the clogging resistance.

By comparing the results of the Examples with the results of the comparative examples, the inventors found the following.

The clogging resistances of the ink compositions of Comparative Examples 1 to 3, and 5 and 6, not containing lithium ions, were insufficient. Therefore, it was found that there is a correlation between the presence of lithium ions in the ink composition and the increase in clogging resistance.

The light fastnesses of the Comparative Examples 5 to 8 containing a dye other than the dye whose free acid is expressed by formula (1) were not good. Therefore, it was found that there is a correlation between the presence of the dye whose free acid is expressed by formula (1) in the ink composition and the increase in the light fastness of the image.

Also, the light fastnesses of the ink compositions of Comparative Examples 4 to 6, not containing an aromatic compound having a carboxy group, were insufficient. Therefore, it was found that there is a correlation between the presence of the aromatic compound having a carboxy group in the ink composition and the increase in the light fastness of the image.

In particular, the recorded articles formed with the ink compositions of Examples 1 to 6 and Comparative Examples 2, 3, 7 and 8, containing a compound having a naphthoic acid skeleton as the aromatic compound having a carboxy group, exhibited high moisture fastnesses. On the other hand, the moisture fastness of the recorded article formed with the ink composition of Example 7, containing benzoic acid as the aromatic compound having a carboxy group, was slightly inferior.

The invention is not limited to the above-described embodiments, and various modifications may be made. For example, the invention includes substantially the same form as the disclosed embodiments (for example, a form including the same function and method and producing the same result, or a form having the same intent and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The ink composition of an embodiment of the invention is useful for recording, and particularly for ink jet recording.

What is claimed is:

1. An ink composition comprising:

a dye whose free acid is expressed by formula (1):

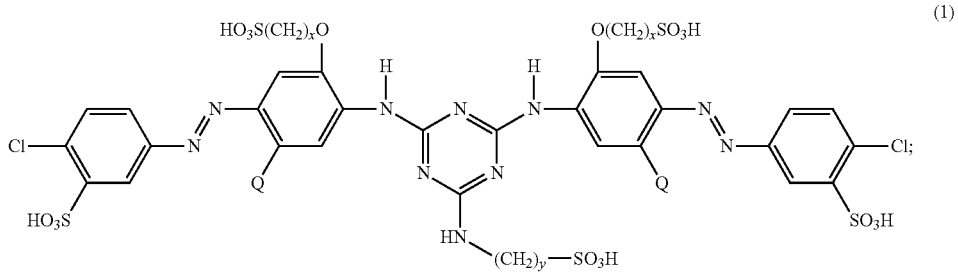

(1)

lithium ions; and an aromatic compound having a carboxy group, wherein in formula (1), Q represents a halogen atom, x represents an integer of 2 to 4, and y represents an integer of 1 to 3.

2. The ink composition according to claim 1, wherein the aromatic compound has a naphthalene ring or a benzene ring.

3. The ink composition according to claim 2, wherein the aromatic compound is at least one compound selected from the group consisting of 2-naphthoic acid, 3-hydroxy-2-naphthoic acid, 6-hydroxy-2-naphthoic acid, 6-methoxy-2-naphthoic acid, and benzoic acid.

4. The ink composition according to claim 1, wherein the molar ratio of the aromatic compound to the dye is in the range of 1 to 10.

5. The ink composition according to claim 1, wherein the ink composition has a pH of 8 to 10.5.

6. A recording method comprising utilizing the ink composition as set forth in claim 1.

7. A recording method comprising utilizing the ink composition as set forth in claim 2.

8. A recording method comprising utilizing the ink composition as set forth in claim 3.

9. A recording method comprising utilizing the ink composition as set forth in claim 4.

10. A recording method comprising utilizing the ink composition as set forth in claim 5.

11. A recorded article produced by the recording method as set forth in claim 6.

12. A recorded article produced by the recording method as set forth in claim 7.

13. A recorded article produced by the recording method as set forth in claim 8.

14. A recorded article produced by the recording method as set forth in claim 9.

15. A recorded article produced by the recording method as set forth in claim 10.

* * * * *